US012138934B2

(12) United States Patent
Maeta et al.

(10) Patent No.: US 12,138,934 B2
(45) Date of Patent: Nov. 12, 2024

(54) IMAGE FORMING SYSTEM, IMAGE FORMING APPARATUS, AND BOTTLE

(71) Applicant: BROTHER KOGYO KABUSHIKI KAISHA, Nagoya (JP)

(72) Inventors: Daisuke Maeta, Nagoya (JP); Masahiko Hayakawa, Ama (JP); Shougo Sato, Seto (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 274 days.

(21) Appl. No.: 17/836,300

(22) Filed: Jun. 9, 2022

(65) Prior Publication Data

US 2022/0410580 A1 Dec. 29, 2022

(30) Foreign Application Priority Data

Jun. 29, 2021 (JP) ................................ 2021-108173

(51) Int. Cl.
*G03G 15/08* (2006.01)
*B41J 2/175* (2006.01)

(52) U.S. Cl.
CPC ...... *B41J 2/17523* (2013.01); *G03G 15/0877* (2013.01); *G03G 15/0879* (2013.01)

(58) Field of Classification Search
USPC ........................................................... 399/27
See application file for complete search history.

(56) References Cited

U.S. PATENT DOCUMENTS

2018/0345673 A1 12/2018 Shirono et al.

FOREIGN PATENT DOCUMENTS

CN 106371299 A * 2/2017 ......... G03G 15/0865
JP 2018-202679 A 12/2018

* cited by examiner

*Primary Examiner* — Quana Grainger
(74) *Attorney, Agent, or Firm* — Merchant & Gould P.C.

(57) ABSTRACT

An image forming system includes an image forming apparatus having an image forming unit and a supplier having a first supply port though which a first consumable item is supplied to a first accommodating portion and a second supply port through which a second consumable item is supplied to a second accommodating portion, and a guide. The image forming system further includes a first bottle including a first connector having a first outlet port connectable to the supplier and a first guided portion configured to be guided by the guide in a state in which the first connector is attached to the supplier, and a second bottle including a second connector having a second outlet port connectable to the supplier and a second guided portion configured to be guided by the guide in a state in which the second connector is attached to the supplier.

19 Claims, 10 Drawing Sheets

IMAGE FORMING SYSTEM, IMAGE FORMING APPARATUS, AND BOTTLE

CROSS REFERENCE TO RELATED APPLICATIONS

The present application claims priority from Japanese Patent Application No. 2021-108173, which was filed on Jun. 29, 2021, the disclosure of which is herein incorporated by reference in its entirety

BACKGROUND ART

The following disclosure relates to an image forming system, an image forming apparatus and a bottle.

There has been known a conventional image forming apparatus including a first ink tank configured to accommodate first ink, a second ink tank configured to accommodate second ink, a first supply port through which the first ink is supplied to the first ink tank, and a second supply port through which the second ink is supplied to the second ink tank.

DESCRIPTION

In the image forming apparatus, there is a possibility that, for example, the second ink is mistakenly supplied to the first supply port.

An aspect of the disclosure relates to an image forming system, an image forming apparatus and a bottle capable of reducing mistakenly supplying consumables with a wrong color.

In one aspect of the disclosure, an image forming system, comprising an image forming apparatus including an image forming unit configured to form an image on a sheet by using a first consumable item and a second consumable item, the image forming unit including a first accommodating portion capable of accommodating the first consumable item and a second accommodating portion capable of accommodating the second consumable item, and a supplier including a first supply port though which the first consumable item is supplied to the first accommodating portion and a second supply port through which the second consumable item is supplied to the second accommodating portion, and a guide which is used at a timing when the first consumable item is supplied to the first accommodating portion, or the second consumable item is supplied to the second accommodating portion, a first bottle including a first connector having (i) a first outlet port connectable to the supplier and through which the first consumable item is supplied and (ii) a first guided portion configured to be guided by the guide in a state in which the first connector is attached to the supplier, the first bottle being capable of accommodating the first consumable item, the first outlet port communicating with the first supply port in the state in which the first connector is connected to the supplier, and a second bottle including a second connector having (i) a second outlet port connectable to the supplier and through which the second consumable item is supplied and (ii) a second guided portion configured to be guided by the guide in a state in which the second connector is attached to the supplier, the second bottle being capable of accommodating the second consumable item, the second outlet port communicating with the second supply port in the state in which the second connector is connected to the supplier.

In another aspect of the disclosure, an image forming apparatus, comprising an image forming unit configured to form an image on a sheet by using a first consumable item and a second consumable item, the image forming unit including a first accommodating portion capable of accommodating the first consumable item and a second accommodating portion capable of accommodating the second consumable item, and a supplier to which a first bottle capable of accommodating the first consumable item or a second bottle capable of accommodating the second consumable item is connectable, the supplier including a first supply port through which the first consumable item is supplied to the first accommodating portion, a second supply port through which the second consumable item is supplied to the second accommodating portion, a guide configured to guide the first bottle so as to be connected to the supplier when the first consumable item is supplied to the first accommodating portion and configured to guide the second bottle so as to be connected to the supplier when the second consumable item is supplied to the second accommodating portion.

In another aspect of the disclosure, a bottle connectable to an image forming apparatus, the image forming apparatus comprising an image forming unit configured to form an image on a sheet by using a first consumable item and a second consumable item, the image forming unit including a first accommodating portion capable of accommodating the first consumable item and a second accommodating portion capable of accommodating the second consumable item, a supplier including a first supply port through which the first consumable item is supplied to the first accommodating portion and a second supply port through which the second consumable item is supplied to the second accommodating portion, and a guide which is used in a timing when the first consumable item is supplied to the first accommodating portion or the second consumable item is supplied to the second accommodating portion, the bottle being connectable to the supplier, wherein the bottle is capable of accommodating the first consumable item, wherein the bottle includes a connector connectable to the supplier and having (i) an outlet port through which the first consumable item is supplied and (ii) a guided portion configured to be guided by the guide when the connector is attached to the supplier, and wherein the outlet port communicates with the first supply port in a state in which the connector is connected to the supplier.

The objects, features, advantages, and technical and industrial significance of the present disclosure will be better understood by reading the following detailed description of the embodiments, when considered in connection with the accompanying drawings, in which.

OUTLINE OF IMAGE FORMING APPARATUS

Figure 5:
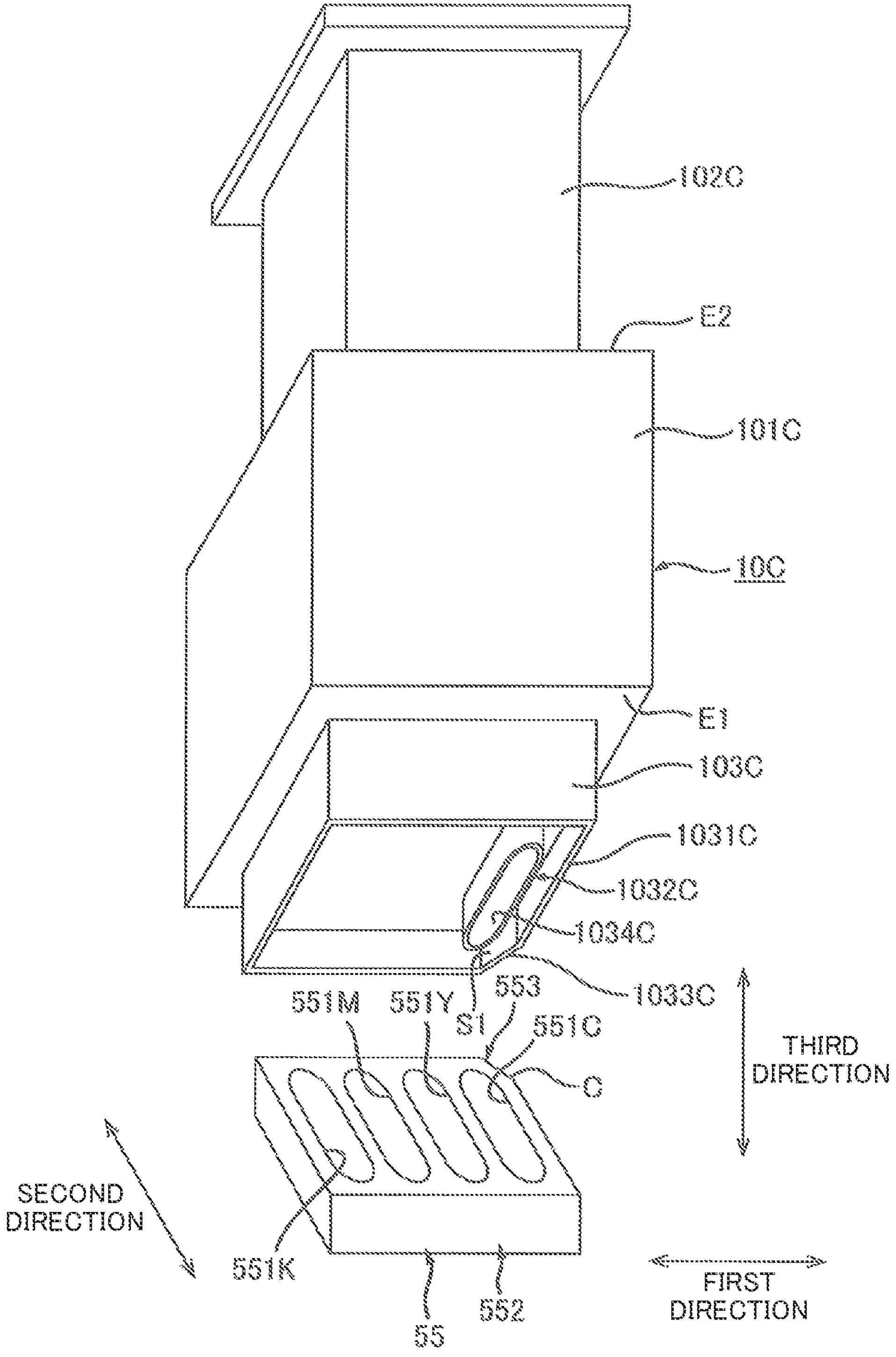
FIG. 5 is a view for explaining a connection of a bottle to the supplier.
Figure 6:
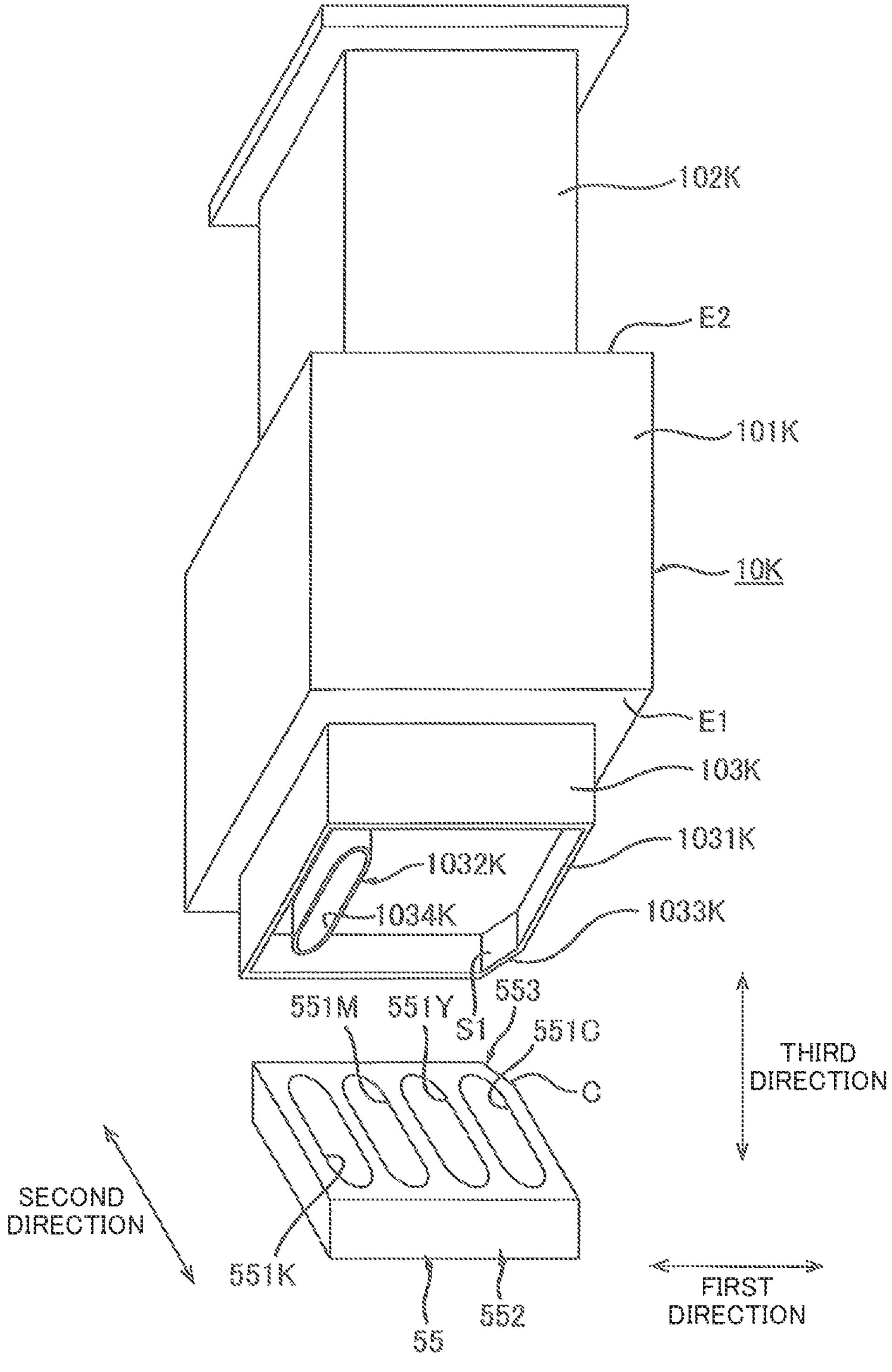
FIG. 6 is a view for explaining a connection of a bottle to the supplier.

An image forming system includes an image forming apparatus 1 (see FIG. 1), a plurality of bottles 10Y (see FIG. 3), 10M (see FIG. 4), 10C (see FIG. 5), 10K (see FIG. 6). Firstly, there will be described an outline of the image forming apparatus 1 of this disclosure in detail with reference to FIG. 1.

Figure 1:
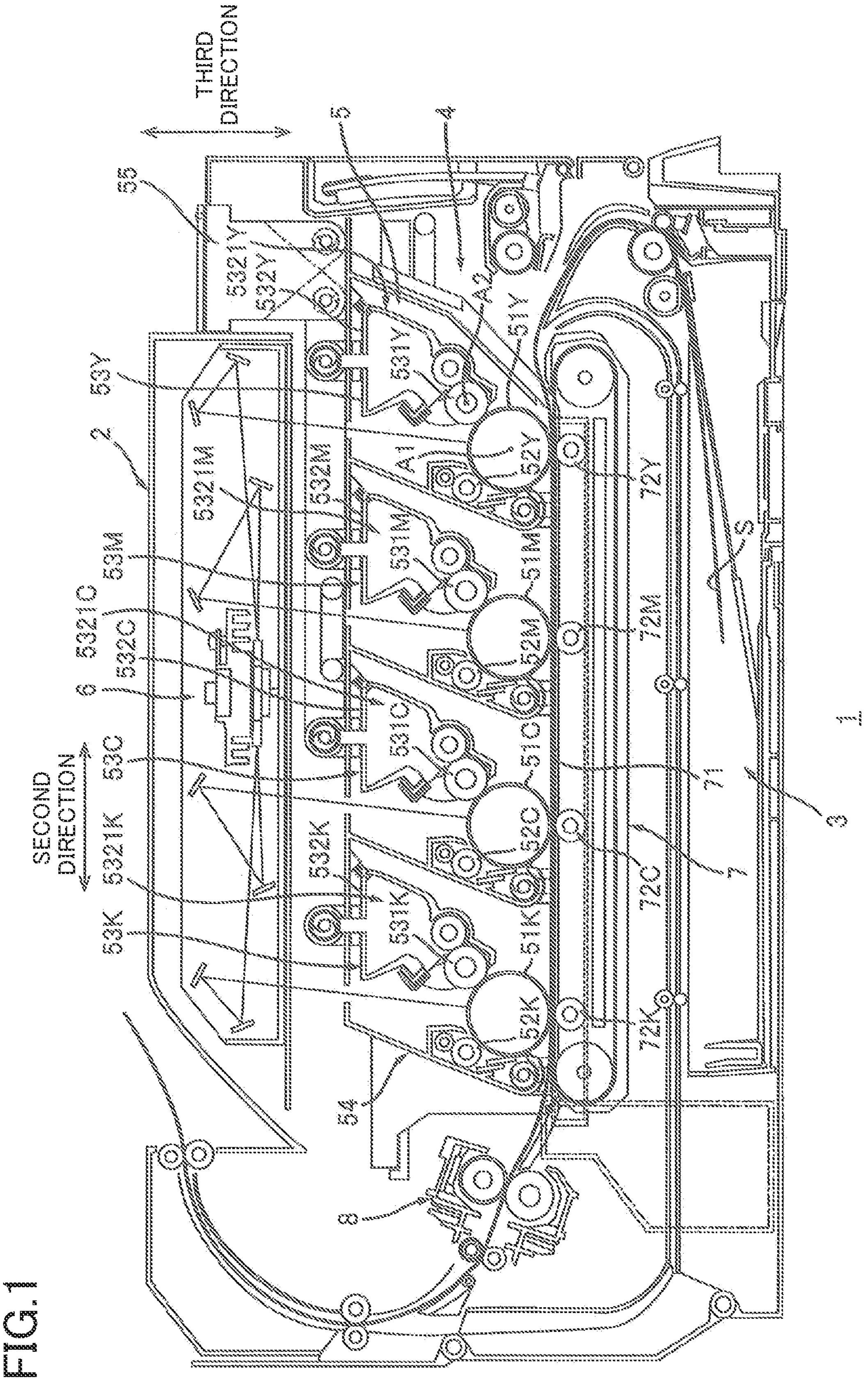
FIG. 1 is a schematic view illustrating a structure of an image forming apparatus.

As illustrated in FIG. 1, the image forming apparatus 1 includes a body housing 2, a sheet accommodating portion 3 and an image forming unit 4.

Body Housing

The body housing 2 accommodates the sheet accommodating portion 3 and the image forming unit 4.

Sheet Accommodating Portion

The sheet accommodating portion 3 is capable of accommodating a sheet S. The sheet S in the sheet accommodating portion 3 is conveyed toward a transfer unit 7 of the image forming unit 4.

Image Forming Unit

The image forming unit 4 is configured to form an image on the sheet S by using first toner as a first consumable item, second toner as a second consumable item, third toner as a third consumable item, and fourth toner as a fourth consumable item. The image forming unit 4 includes a process cartridge 5, an exposing unit 6, the transfer unit 7 and a fixing unit 8.

Process Cartridge

The process cartridge 5 is replaceable with respect to the image forming apparatus 1. The process cartridge 5 includes a plurality of photoconductive drums 51Y, 51M, 51C, 51K, a plurality of charging units 52Y, 52M, 52C, 52K, a plurality of developing units 53Y, 53M, 53C, 53K. That is, the image forming unit 4 includes the photoconductive drums 51Y, 51M and the developing units 53Y, 53M.

Photoconductive Drums

The photoconductive drum 51Y is rotatable around a drum axis A1. The drum axis A1 extends in a first direction. The photoconductive drum 51Y extends in the first direction. The photoconductive drum 51Y has a cylindrical shape.

An explanation of each of the photoconductive drums 51M, 51C, 51K is the same as an explanation of the photoconductive drum 51Y. Accordingly, the explanation of each of the photoconductive drums 51M, 51C, 51K is dispensed with.

The plurality of photoconductive drums 51Y, 51M, 51C, 51K are arranged in a second direction. The second direction intersects the first direction. It is preferable that the second direction is orthogonal to the first direction.

Charging Units

The charging unit 52Y charges a circumferential surface of the photoconductive drum 51Y with electricity. The charging unit 52M charges a circumferential surface of the photoconductive drum 51M with electricity. The charging unit 52C charges a circumferential surface of the photoconductive drum 51C with electricity. The charging unit 52K charges a circumferential surface of the photoconductive drum 51K with electricity. Each of the plurality of charging units 52Y, 52M, 52C, 52K is a charging roller. Each of the plurality of charging units 52Y, 52M, 52C, 52K may be a scorotron type charging unit.

Developing Units

The developing unit 53Y is capable of supplying the first toner to the photoconductive drum 51Y. The developing unit 53Y includes a developing roller 531Y and a developing housing 532Y. Similarly, the developing unit 53M includes a developing roller 531M and a developing housing 532M, the developing unit 53C includes a developing roller 531C and a developing housing 532C, and the developing unit 53K includes a developing roller 531K and a developing housing 532K.

The developing roller 531Y is capable of supplying the first toner in the developing housing 532Y to the photoconductive drum 51Y. The developing roller 531Y is in contact with the photoconductive drum 51Y. The developing roller 531Y extends in the first direction. The developing roller 531Y is rotatable around an axis A2. The axis A2 extends in the first direction.

The developing housing 532Y supports the developing roller 531Y. The developing housing 532Y includes an accommodating portion 5321Y. In other words, the image forming unit 4 includes the accommodating portion 5321Y. The accommodating portion 5321Y is capable of accommodating the first toner.

An explanation of each of the developing units 53M, 53C, 53K is the same as an explanation of the developing unit 53Y.

That is, the developing unit 53M is capable of supplying the second toner to the photoconductive drum 51M. The developing housing 532M includes an accommodating portion 5321M. In other words, the image forming unit 4 includes the accommodating portion 5321M. The accommodating portion 5321M is capable of accommodating the second toner.

The developing unit 53C is capable of supplying the third toner to the photoconductive drum 51C. The developing housing 532C includes an accommodating portion 5321C. The accommodating portion 5321C is capable of accommodating the third toner.

The developing unit 53K is capable of supplying the fourth toner to the photoconductive drum 51K. The developing housing 532K includes an accommodating portion 5321K. The accommodating portion 5321K is capable of accommodating the fourth toner.

Exposing Unit

The exposing unit 6 is capable of exposing a circumferential surface of each of the plurality of photoconductive drums 51Y, 51M, 51C, 51K. In the present embodiment, the exposing unit 6 is a laser scanning unit.

Transfer Unit

The transfer unit 7 is located below the plurality of photoconductive drums 51Y, 51M, 51C, 51K. The transfer unit 7 includes a belt 71 and a plurality of transfer rollers 72Y, 72M, 72C, 72K.

The belt 71 conveys the sheet S conveyed from the sheet accommodating portion 3 toward the fixing unit 8. In a state in which the process cartridge 5 is mounted on the image forming apparatus 1, the belt 71 is in contact with the plurality of photoconductive drums 51Y, 51M, 51C, 51K.

The transfer roller 72Y transfers toner on the photoconductive drum 51Y to the sheet S which is conveyed by the belt 71. The transfer roller 72M transfers toner on the photoconductive drum 51M to the sheet S which is conveyed by the belt 71. The transfer roller 72C transfers toner on the photoconductive drum 51C to the sheet S which is conveyed by the belt 71. The transfer roller 72K transfers toner on the photoconductive drum 51K to the sheet S which is conveyed by the belt 71.

Fixing Unit

The fixing unit 8 heats and presses the sheet S on which the toner is transferred so that the toner is fixed to the sheet S. The sheet S which has passed the fixing unit 8 is discharged on an upper surface of the body housing 2.

Process Cartridge

Next, there will be described the process cartridge 5 in detail with reference to FIG. 1 to FIG. 6. In the following description, "the first direction" and "the second direction" of the process cartridge 5 are "the first direction" and "the second direction" in a state in which the process cartridge 5 is mounted on the image forming apparatus 1.

The process cartridge 5 includes a process housing 54, a supplier 55 and a plurality of toner tubes 56Y, 56M, 56C, 56K in addition to the plurality of photoconductive drums 51Y, 51M, 51C, 51K, the plurality of charging units 52Y, 52M, 52C, 52K and the plurality of developing units 53Y, 53M, 53C, 53K. That is, the image forming apparatus 1 includes the supplier 55.

Process Housing

The process housing 54 supports the plurality of photoconductive drums 51Y, 51M, 51C, 51K, the plurality of charging units 52Y, 52M, 52C, 52K, the plurality of developing units 53Y, 53M, 53C, 53K, the supplier 55 and the plurality of toner tubes 56Y, 56M, 56C, 56K.

Supplier

As illustrated in FIG. 1, in the state in which the process cartridge 5 is mounted on the image forming apparatus 1, the supplier 55 is located on an opposite side of the exposing unit 6 from the fixing unit 8 in the second direction. In the state in which the process cartridge 5 is mounted on the image forming apparatus 1, the supplier 55 is exposed from the body housing 2.

Figure 2:
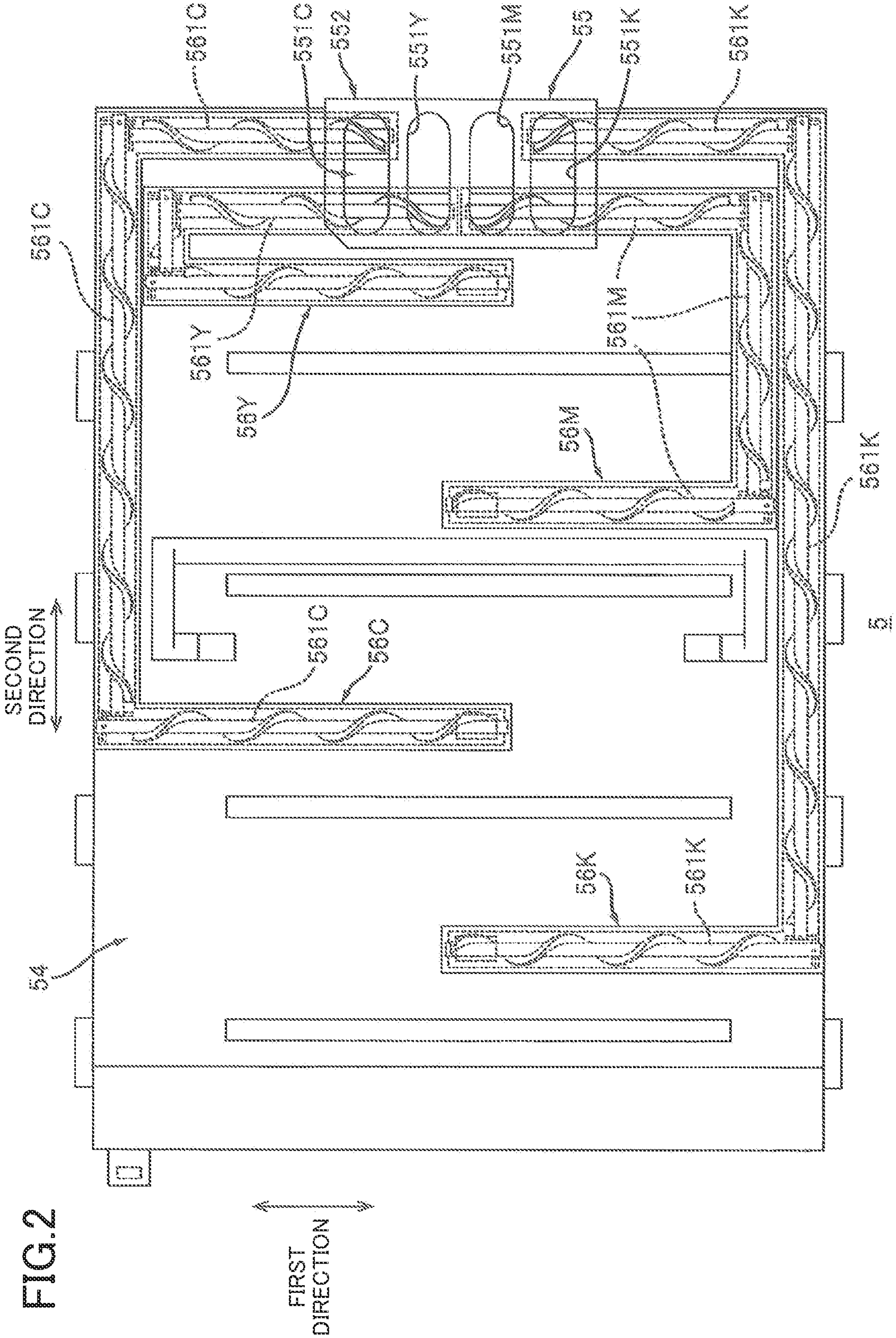
FIG. 2 is a plan view illustrating a process cartridge in FIG. 1.

As illustrated in FIG. 2, the supplier 55 is located at a first end portion of the process cartridge 5 in the second direction. In the present embodiment, the supplier 55 extends in the first direction and the second direction. The supplier 55 has a rectangular shape. The supplier 55 includes a plurality of supply ports 551Y, 551M, 551C, 551K and a guide 552.

Supply Ports

In the present embodiment, the plurality of supply ports 551Y, 551M, 551C, 551K are arranged in the first direction. Each of the plurality of supply ports 551Y, 551M, 551C, 551K extends in the second direction. Each of the plurality of supply ports 551Y, 551M, 551C, 551K is an elongated hole extending in the second direction.

Figure 3:
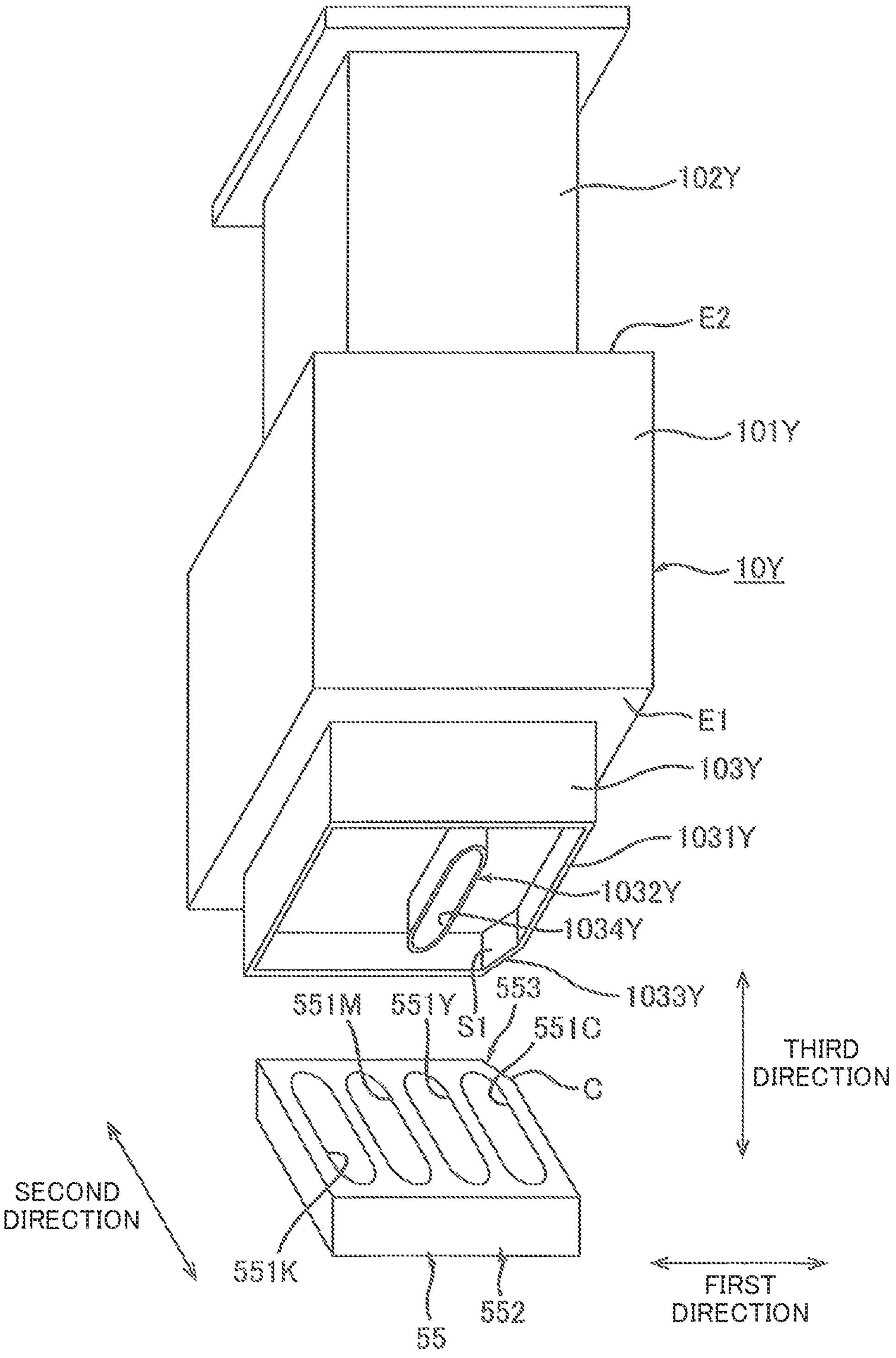
FIG. 3 is a view for explaining a connection of a bottle to a supplier.

As illustrated in FIG. 3, in a state in which the bottle 10Y is connected to the supplier 55, an outlet portion 1032Y of the bottle 10Y is fitted into the supply port 551Y. The outlet portion 1032Y will be described below. In the state in which the bottle 10Y is connected to the supplier 55, the supply port 551Y receives the first toner from the bottle 10Y. The first toner received by the supply port 551Y is supplied to the accommodating portion 5321Y of the developing unit 53Y (see FIG. 1) through the toner tube 56Y (see FIG. 2).

Figure 4:
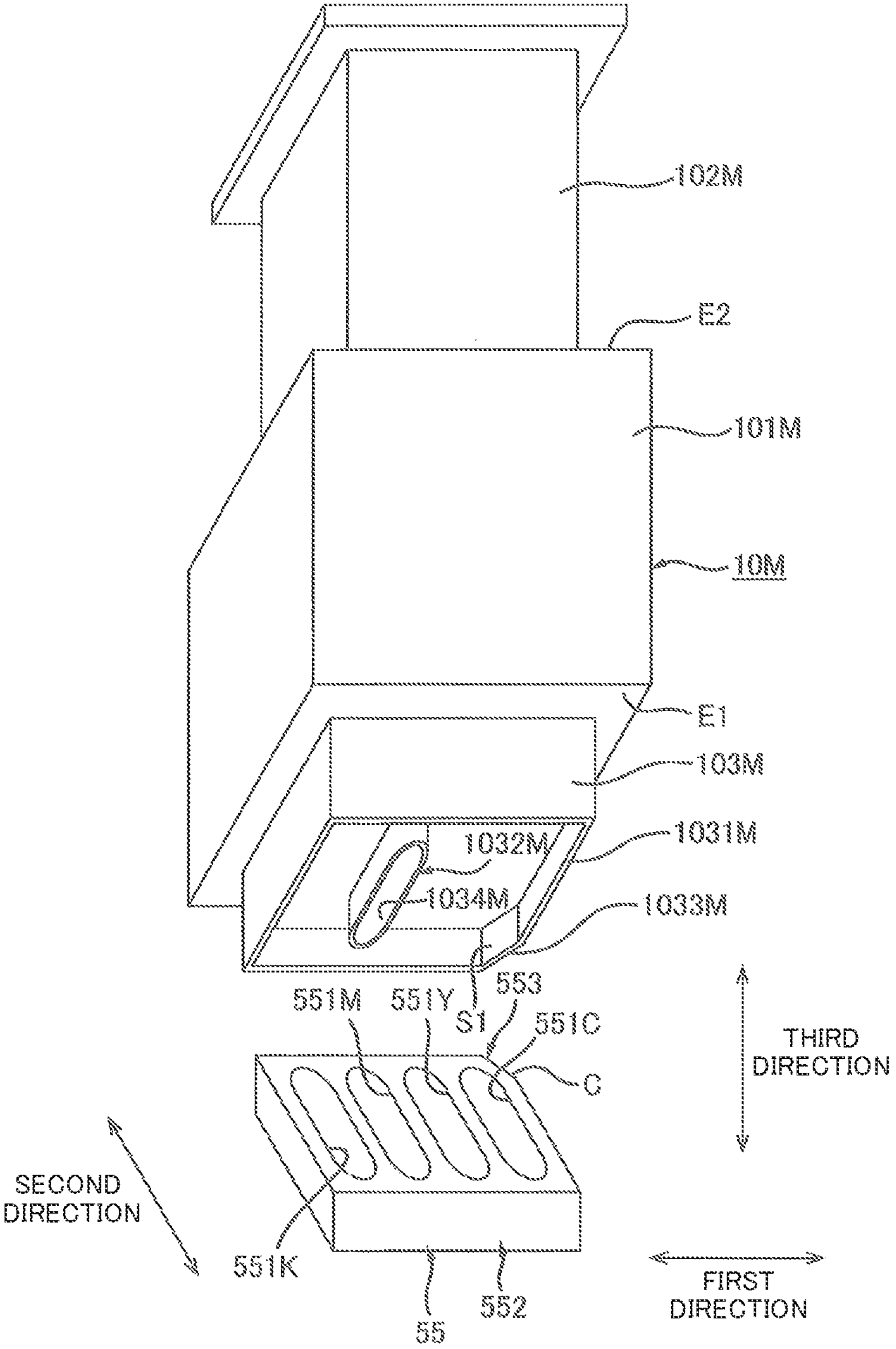
FIG. 4 is a view for explaining a connection of a bottle to the supplier.

As illustrated in FIG. 4, in a state in which the bottle 10M is connected to the supplier 55, an outlet portion 1032M of the bottle 10M is fitted into the supply port 551M. The outlet portion 1032M will be described below. In the state in which the bottle 10M is connected to the supplier 55, the supply port 551M receives the second toner from the bottle 10M. The second toner received by the supply port 551Y is supplied to the accommodating portion 5321M of the developing unit 53M (see FIG. 1) through the toner tube 56M (see FIG. 2).

As illustrated in FIG. 5, in a state in which the bottle 10C is connected to the supplier 55, an outlet portion 1032C of the bottle 10C is fitted into the supply port 551C. The outlet portion 1032C will be described below. In the state in which the bottle 10C is connected to the supplier 55, the supply port 551C receives the third toner from the bottle 10C. The third toner received by the supply port 551C is supplied to the accommodating portion 5321C of the developing unit 53C (see FIG. 1) through the toner tube 56C (see FIG. 2).

As illustrated in FIG. 6, in a state in which a bottle 10K is connected to the supplier 55, an outlet portion 1032K of the bottle 10K is fitted into the supply port 551K. The outlet portion 1032K will be described below. In the state in which the bottle 10K is connected to the supplier 55, the supply port 551K receives the fourth toner from the bottle 10K. The fourth toner received by the supply port 551K is supplied to the accommodating portion 5321K of the developing unit 53K (see FIG. 1) through the toner tube 56K (see FIG. 2).

Guide

As illustrated in FIG. 3, the guide 552 is used at a timing when the first toner is supplied to the accommodating portion 5321Y of the developing unit 53Y. The guide 552 guides a connector 103Y of the bottle 10Y in a state in which the bottle 10Y is attached to the supplier 55.

Moreover, as illustrated in FIG. 4, the guide 552 is also used at a timing when the second toner is supplied to the accommodating portion 5321M of the developing unit 53M. The guide 552 guides a connector 103M of the bottle 10M in a state in which the bottle 10M is attached to the supplier 55.

Moreover, as illustrated in FIG. 5, the guide 552 is also used when the third toner is supplied to the accommodating portion 5321C of the developing unit 53C. The guide 552 guides a connector 103C of the bottle 10C in a state in which the bottle 10C is attached to the supplier 55.

Moreover, as illustrated in FIG. 6, the guide 552 is also used when the fourth toner is supplied to the accommodating portion 5321K of the developing unit 53K. The guide 552 guides a connector 103K of the bottle 10K in a state in which the bottle 10K is attached to the supplier 55.

As illustrated in FIG. 3, in the present embodiment, the guide 552 is a side face of the supplier 55. The guide 552 extends in a third direction in the state in which the process cartridge 5 is mounted on the image forming apparatus 1. The third direction intersects the first direction and the second direction. It is preferable that the third direction is orthogonal to the first direction and the second direction. The third direction is an up and down direction in a state in which the image forming apparatus 1 is placed on a horizontal surface. The guide 552 includes an alignment portion 553. In other words, the supplier 55 includes the alignment portion 553. Moreover, in other words, the image forming apparatus 1 includes the alignment portion 553.

When the bottle 10Y is attached to the supplier 55, the alignment portion 553 is used so as to position the bottle 10Y with respect to the supplier 55. More specifically, in a case where a position of the bottle 10Y with respect to the supplier 55 is a position at which an engaging portion 1033Y of the bottle 10Y engages with the alignment portion 553, the bottle 10Y is connectable to the supplier 55. The engaging portion 1033Y will be described below. On the other hand, in a case where the position of the bottle 10Y with respect to the supplier 55 is a position at which the engaging portion 1033Y does not engage with the alignment portion 553, the bottle 10Y is not connectable to the supplier 55. Accordingly, in a case where a user positions the bottle 10Y with respect to the supplier 55 so that the engaging portion 1033Y engages with the alignment portion 553, the user can easily connect the bottle 10Y to the supplier 55.

It is noted that, as illustrated in FIG. 4, when the bottle 10M is attached to the supplier 55, the alignment portion 553 is also used so as to position the bottle 10M with respect to the supplier 55. As illustrated in FIG. 5, when the bottle 10C is attached to the supplier 55, the alignment portion 553 is also used so as to position the bottle 10C with respect to the supplier 55. Moreover, as illustrated in FIG. 6, when the bottle 10K is attached to the supplier 55, the alignment portion 553 is also used so as to position the bottle 10K with respect to the supplier 55.

In the present embodiment, the alignment portion 553 is provided at one corner of the supplier 55. The alignment portion 553 has a cutout C.

Toner Tubes

As illustrated in FIG. 2, the toner tube 56Y allows the first toner to move from the supply port 551Y to the developing unit 53Y. A plurality of screws 561Y are disposed in the toner tube 56Y. The plurality of screws 561Y convey the toner which has been supplied to the supply port 551Y to the developing unit 53Y.

The toner tube 56M allows the second toner to move from the supply port 551M to the developing unit 53M. A plurality of screws 561M are disposed in the toner tube 56M. The plurality of screws 561M convey the toner which has been supplied to the supply port 551M to the developing unit 53M.

The toner tube 56C allows the third toner to move from the supply port 551C to the developing unit 53C. A plurality of screws 561C are disposed in the toner tube 56C. The plurality of screws 561C convey the toner which has been supplied to the supply port 551C to the developing unit 53C.

The toner tube 56K allows the fourth toner to move from the supply port 551K to the developing unit 53K. A plurality of screws 561K are disposed in the toner tube 56K. The plurality of screws 561K convey the toner which has been supplied to the supply port 551K to the developing unit 53K.

Bottles

Next, there will be described the plurality of bottles 10Y, 10M, 10C, 10K with reference to FIG. 3 to FIG. 6.

Bottle

As illustrated in FIG. 3, the bottle 10Y includes a bottle body 101Y, a piston 102Y and the connector 103Y.

Bottle Body

The bottle body 101Y is capable of accommodating the first toner. In other words, the bottle 10Y is capable of accommodating the first toner. The bottle body 101Y has a cylindrical shape. The bottle body 101Y has a first end portion E1 and a second end portion E2 in a direction in which the bottle body 101Y extends.

Piston

The piston 102Y is capable of pushing out the first toner in the bottle body 101Y. The piston 102Y extends in a direction in which the bottle body 101Y extends. The piston 102Y is fitted into the second end portion E2 of the bottle body 101Y. The piston 102Y is movable with respect to the bottle body 101Y in the direction in which the bottle body 101Y extends.

Connector

The connector 103Y is located at the first end portion E1 of the bottle body 101Y. The connector 103Y is connectable to the supplier 55. The connector 103Y includes a guided portion 1031Y and the outlet portion 1032Y. In other words, the bottle 10Y includes the outlet portion 1032Y.

Guided Portion

The guided portion 1031Y is guided by the guide 552 when the connector 103Y is attached to the supplier 55. The guided portion 1031Y is located at the first end portion E1 of the bottle body 101Y. The guided portion 1031Y extends from the first end portion E1 of the bottle body 101Y. The guided portion 1031Y may be attached to the first end portion E1 of the bottle body 101Y. The guided portion 1031Y has a rectangular cylindrical shape. An inner surface of the guided portion 1031Y is opposed to the guide 552 in the state in which the connector 103Y is connected to the supplier 55. The guided portion 1031Y extends along the guide 552 in the state in which the connector 103Y is connected to the supplier 55. The guided portion 1031Y includes the engaging portion 1033Y. In other words, the connector 103Y includes the engaging portion 1033Y. Moreover, in other words, the bottle 10Y includes the engaging portion 1033Y.

When the connector 103Y is attached to the supplier 55, the engaging portion 1033Y is engageable with the alignment portion 553. The connector 103Y is connectable to the supplier 55 in a state in which the engaging portion 1033Y is engageable with the alignment portion 553. On the other hand, the connector 103Y is not connectable to the supplier 55 in a state in which the engaging portion 1033Y is not engageable with the alignment portion 553. More specifically, in a case where the position of the bottle 10Y with respect to the supplier 55 is a position at which the engaging portion 1033Y is not engageable with the alignment portion 553, the engaging portion 1033Y comes into contact with a corner of the supplier 55 when the connector 103Y is tried to be attached to the supplier 55. Accordingly, the connector 103Y is not connectable to the supplier 55.

The engaging portion 1033Y has a surface S1. The surface S1 is an inner surface of the engaging portion 1033Y. The surface S1 is opposed to the cutout C of the alignment portion 553 in a state in which the engaging portion 1033Y engages with the alignment portion 553. The surface S1 extends along the cutout C of the alignment portion 553 in the state in which the engaging portion 1033Y engages with the alignment portion 553.

Outlet Portion

In the state in which the connector 103Y is connected to the supplier 55, the outlet portion 1032Y is fitted into the supply port 551Y. The outlet portion 1032Y is located on an inner side of the guided portion 1031Y. The outlet portion 1032Y is located at a particular position with respect to the engaging portion 1033Y. The particular position is a position at which the outlet portion 1032Y is fitted into the supply port 551Y in a case where a position of the engaging portion 1033Y of the bottle 10Y with respect to the supplier 55 is a position at which the engaging portion 1033Y engages with the alignment portion 553. It is noted that in a case where the position of the engaging portion 1033Y of the bottle 10Y with respect to the supplier 55 is a position at which the engaging portion 1033Y is not engaged with the alignment portion 553, the outlet portion 1032Y is not fitted into the supply port 551Y. That is, the connector 103Y is not connected to the supplier 55 in the state in which the outlet portion 1032Y is not fitted into the supply port 551Y.

The outlet portion 1032Y is located at the first end portion E1 of the bottle body 101Y. The outlet portion 1032Y extends from the first end portion E1 of the bottle body 101Y. The outlet portion 1032Y may be attached to the first end portion E1 of the bottle body 101Y. The outlet portion 1032Y extends in a direction in which the guided portion 1031Y extends. The outlet portion 1032Y communicates with the bottle body 101Y. The outlet portion 1032Y includes an outlet port 1034Y. In other words, the connector 103Y includes the outlet port 1034Y.

The outlet port 1034Y is capable of supplying the first toner in the bottle body 101Y. The outlet port 1034Y communicates with the supply port 551Y in the state in which the connector 103Y is connected to the supplier 55. It is noted that in a case where the position of the engaging portion 1033Y of the bottle 10Y with respect to the supplier 55 is a position at which the engaging portion 1033Y does not engage with the alignment portion 553, the outlet port 1034Y does not communicate with the supply port 551Y. That is, the connector 103Y is not connectable to the supplier 55 in the state in which the outlet port 1034Y does not communicate with the supply port 551Y.

Bottle

As illustrated in FIG. 4, the bottle 10M is capable of accommodating the second toner. The bottle 10M includes the connector 103M. The connector 103M is connectable to the supplier 55.

The connector 103M includes a guided portion 1031M and the outlet portion 1032M. In other words, the bottle 10M includes the outlet portion 1032M.

The guided portion 1031M is guided by the guide 552 when the connector 103M is attached to the supplier 55. The guided portion 1031M has a structure the same as the guided portion 1031Y of the bottle 10Y. The guided portion 1031M includes an engaging portion 1033M. In other words, the connector 103M includes the engaging portion 1033M. Moreover, in other words, the bottle 10M includes the engaging portion 1033M.

The engaging portion 1033M is engageable with the alignment portion 553. The engaging portion 1033M has the surface S1, similar to the engaging portion 1033Y of the bottle 10Y. The connector 103M is connectable to the supplier 55 in a state in which the engaging portion 1033M is engageable with the alignment portion 553. On the other hand, the connector 103M is not connectable to the supplier 55 in a state in which the engaging portion 1033M is not engageable with the alignment portion 553.

In the state in which the connector 103M is connected to the supplier 55, the outlet portion 1032M is fitted into the supply port 551M. A position of the outlet portion 1032M in the connector 103M is different from a position of the outlet portion 1032Y in the connector 103Y of the bottle 10Y (see FIG. 3). The connector 103M is not connectable to the supplier 55 in a state in which the outlet portion 1032M is not fitted into the supply port 551M. The outlet portion 1032M includes an outlet port 1034M. In other words, the connector 103M includes the outlet port 1034M.

The outlet port 1034M is capable of supplying the second toner in a bottle body 101M. The outlet port 1034M communicates with the supply port 551M in the state in which the connector 103M is connected to the supplier 55. In other words, the connector 103M is not connectable to the supplier 55 in a state in which the outlet portion 1032M does not communicate with the supply port 551M. It is noted that, as illustrated in FIG. 3 and FIG. 4, a position of the supply port 551Y in the supplier 55 is different from a position of the supply port 551M in the supplier 55. Moreover, a position of the outlet port 1034Y with respect to the supplier 55 in the state in which the connector 103Y is connected to the supplier 55 is different from a position of the outlet port 1034M with respect to the supplier 55 in the state in which the connector 103M is connected to the supplier 55. That is, the outlet port 1034Y is located at a position in the guided portion 1031Y corresponding to the position of the supply port 551Y so that the outlet portion 1032Y communicates with the supply port 551Y in the state in which the connector 103Y is connected to the supplier 55. Similarly, the outlet port 1034M is located at a position in the guided portion 1031M corresponding to the position of the supply port 551M so that the outlet portion 1032M communicates with the supply port 551M in the state in which the connector 103M is connected to the supplier 55.

Bottle

As illustrated in FIG. 5, a bottle 10C is capable of accommodating the third toner. The bottle 10C includes the connector 103C. The connector 103C is connectable to the supplier 55.

The connector 103C includes a guided portion 1031C and the outlet portion 1032C. In other words, the bottle 10C includes the outlet portion 1032C.

The guided portion 1031C is guided by the guide 552 when the connector 103C is attached to the supplier 55. The guided portion 1031C has a structure the same as the guided portion 1031Y of the bottle 10Y. The guided portion 1031C includes an engaging portion 1033C. In other words, the connector 103C includes the engaging portion 1033C. Moreover, in other words, the bottle 10C includes the engaging portion 1033C.

The engaging portion 1033C is engageable with the alignment portion 553. The engaging portion 1033C has the surface S1, similar to the engaging portion 1033Y of the bottle 10Y. The connector 103C is connectable to the supplier 55 in a state in which the engaging portion 1033C is engageable with the alignment portion 553. On the other hand, the connector 103C is not connectable to the supplier 55 in a state in which the engaging portion 1033C is not engageable with the alignment portion 553.

In the state in which the connector 103C is connected to the supplier 55, the outlet portion 1032C is fitted into the supply port 551C. A position of the outlet portion 1032C in the connector 103C is different from the position of the outlet portion 1032Y in the connector 103Y of the bottle 10Y (see FIG. 3) and the position of the outlet portion 1032M in the connector 103M of the bottle 10M (see FIG. 4). The connector 103C is not connectable to the supplier 55 in a state in which the outlet portion 1032C is not fitted into the supply port 551C. The outlet portion 1032C includes an outlet port 1034C. In other words, the connector 103C includes the outlet port 1034C.

The outlet port 1034C is capable of supplying the third toner in a bottle body 101C. The outlet port 1034C communicates with the supply port 551C in the state in which the connector 103C is connected to the supplier 55. In other words, the connector 103C is not connected to the supplier 55 in a state in which the outlet portion 1032C does not communicate with the supply port 551C.

Bottle

As illustrated in FIG. 6, the bottle 10K is capable of accommodating the fourth toner. The bottle 10K includes the connector 103K. The connector 103K is connectable to the supplier 55.

The connector 103K includes a guided portion 1031K and the outlet portion 1032K. In other words, the bottle 10K includes the outlet portion 1032K.

The guided portion 1031K is guided by the guide 552 when the connector 103K is attached to the supplier 55. The guided portion 1031K has a structure the same as the guided portion 1031Y of the bottle 10Y. The guided portion 1031K includes an engaging portion 1033K. In other words, the connector 103K includes the engaging portion 1033K. Moreover, in other words, the bottle 10K includes the engaging portion 1033K.

The engaging portion 1033K is engageable with the alignment portion 553. The engaging portion 1033K has the surface S1, similar to the engaging portion 1033Y of the bottle 10Y. The connector 103K is connectable to the supplier 55 in a state in which the engaging portion 1033K is engageable with the alignment portion 553. On the other hand, the connector 103K is not connectable to the supplier 55 in a state in which the engaging portion 1033K is not engageable with the alignment portion 553.

In the state in which the connector 103K is connected to the supplier 55, the outlet portion 1032K is fitted into the supply port 551K. A position of the outlet portion 1032K in the connector 103K is different from the position of the outlet portion 1032Y in the connector 103Y of the bottle 10Y (see FIG. 3), the position of the outlet portion 1032M in the connector 103M of the bottle 10M (see FIG. 4), and the position of the outlet portion 1032C in the connector 103C of the bottle 10C (see FIG. 5). The connector 103K is not connectable to the supplier 55 in a state in which the outlet portion 1032K is not fitted into the supply port 551K. The outlet portion 1032K includes an outlet port 1034K. In other words, the connector 103K includes the outlet port 1034K.

The outlet port 1034K is capable of supplying the fourth toner in a bottle body 101K. The outlet port 1034K communicates with the supply port 551K in the state in which the connector 103K is connected to the supplier 55. In other words, the connector 103K is not connectable to the supplier 55 in a state in which the outlet portion 1032K does not communicate with the supply port 551K.

Effects

According to the image forming system, as illustrated in FIG. 2, the supplier 55 of the image forming apparatus 1 includes the supply port 551Y configured to supply the first toner and the supply port 551M configured to supply the second toner.

As illustrated in FIG. 3 and FIG. 4, the bottle 10Y or the bottle 10M is connectable to the supplier 55. That is, the bottle 10Y and the bottle 10M are connected to the same supplier 55.

Then, as illustrated in FIG. 3, the outlet port 1034Y of the bottle 10Y communicates with the supply port 551Y when the bottle 10Y is attached to the supplier 55. On the other hand, as illustrated in FIG. 4, the outlet port 1034M of the bottle 10M communicates with the supply port 551M when the bottle 10M is attached to the supplier 55.

Accordingly, the user can properly supply the first toner to the supply port 551Y and properly supply the second toner to the supply port 551M by only connecting the bottle 10 to the supplier 55 without checking a color of the toner accommodated in the bottle 10.

As a result, it is possible to reduce mistakenly supplying consumables with a wrong color.

According to the image forming system, the connector 103Y is not connectable to the supplier 55 in the state in which the outlet port 1034Y does not communicate with the supply port 551Y. Moreover, the connector 103M is not connectable to the supplier 55 in the state in which the outlet port 1034M does not communicate with the supply port 551M.

Accordingly, it is possible to reduce a situation in which the bottle 10Y is attached to the supplier 55 in the state in which the outlet port 1034Y does not communicate with the supply port 551Y. Moreover, it is possible to reduce a situation in which the bottle 10M is attached to the supplier 55 in the state in which the outlet port 1034M does not communicate with the supply port 551M.

As a result, it is possible to reduce mistakenly supplying consumables with the wrong color.

According to the image forming system, as illustrated in FIG. 3, the image forming apparatus 1 includes the alignment portion 553.

Accordingly, it is possible to properly attach the bottle 10Y to the supplier 55 by aligning the engaging portion 1033Y with the alignment portion 553. Moreover, as illustrated in FIG. 4, it is possible to properly attach the bottle 10M to the supplier 55 by aligning the engaging portion 1033M with the alignment portion 553.

Accordingly, it is possible to reduce mistakenly supplying consumables with the wrong color.

According to the image forming system, as illustrated in FIG. 3, the supplier 55 includes the alignment portion 553.

Accordingly, as illustrated in FIG. 3 and FIG. 4, it is possible to attach the connector 103Y or the connector 103M to the supplier 55 while positioning the engaging portion 1033Y or the engaging portion 1033M with respect to the alignment portion 553.

Accordingly, it is possible to attach the bottle 10Y or the bottle 10M to the supplier 55 more smoothly.

According to the image forming system, as illustrated in FIG. 3, the guide 552 includes the alignment portion 553.

Accordingly, it is possible to guide the connector 103Y or the connector 103M so as to be connected to the supplier 55 while positioning the engaging portion 1033Y or the engaging portion 1033M with respect to the alignment portion 553.

As a result, it is possible to attach the bottle 10Y or the bottle 10M to the supplier 55 more smoothly.

The connector 103Y is not connectable to the supplier 55 in the state in which the outlet portion 1032Y is not fitted into the supply port 551Y. The connector 103M is not connectable to the supplier 55 in the state in which the outlet portion 1032M is not fitted into the supply port 551M.

Accordingly, it is possible to reduce a situation in which the bottle 10Y is attached to the supplier 55 in the state in which the outlet portion 1032Y is not fitted into the supply port 551Y. Moreover, it is possible to reduce a situation in which the bottle 10M is attached to the supplier 55 in the state in which the outlet portion 1032M is not fitted into the supply port 551M.

As a result, it is possible to reduce mistakenly supplying consumables with the wrong color.

Modifications

In the following description, there will be described modifications with reference to FIG. 7A to FIG. 10. In the modifications described below, the same reference numerals as used in the above-described embodiment are used to designate the corresponding elements of the modifications, and an explanation of each of which is dispensed with.

A shape of the supply port is not limited to the above described shape. As a supplier 200 illustrated in FIG. 7A, for example, each of the plurality of supply port 201Y, 201M, 201C, 201K may be have a circular shape.

The number of the alignment portion is not limited to the above described number. As a supplier 300 illustrated in FIG. 7B, the image forming apparatus includes a plurality of alignment portions 301A, 301B.

A shape of the alignment portion is not limited to the above described shape. As a supplier 400 illustrated in FIG. 7C, an alignment portion 401 may be a recessed portion. In this case, each of the first engaging portion and the second engaging portion may be a protrusion. The protrusion is fitted into the recessed portion.

Figure 7A:
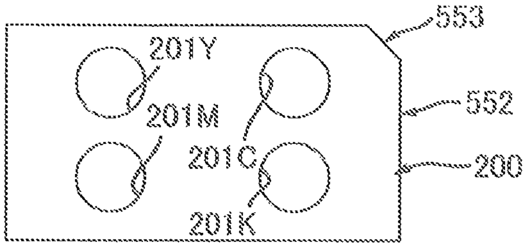
FIG. 7A is a view for explaining a supplier.
Figure 7B:
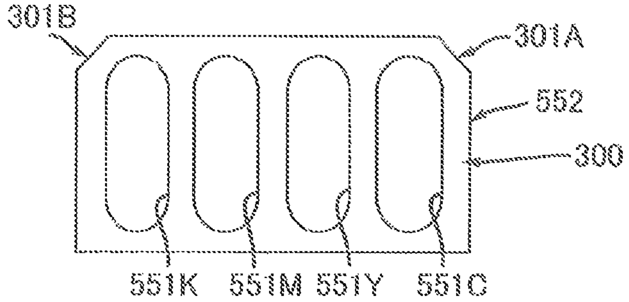
FIG. 7B is a view for explaining a supplier.
Figure 7C:
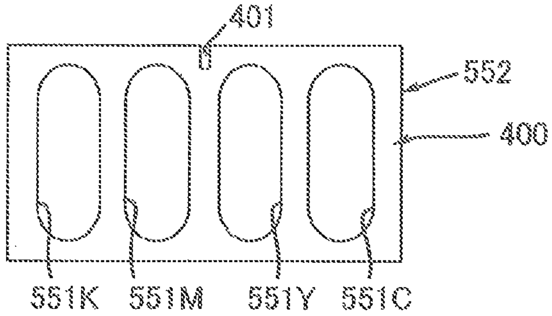
FIG. 7C is a view for explaining a supplier.
Figure 7D:
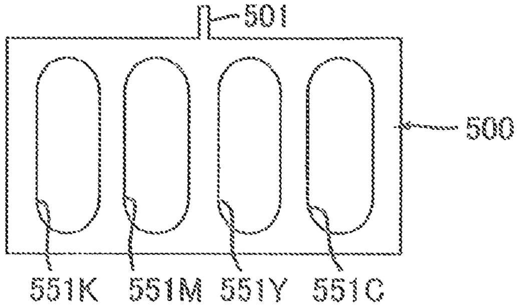
FIG. 7D is a view for explaining a supplier.
Figure 7E:
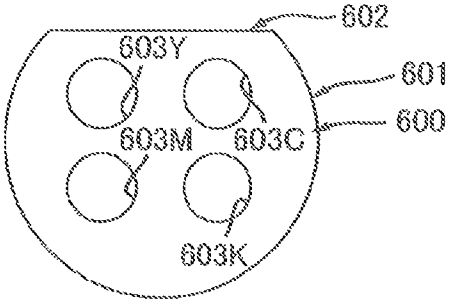
FIG. 7E is a view for explaining a supplier.

Moreover, as a supplier 500 illustrated in FIG. 7D, an alignment portion 501 may be a protrusion. In this case, each of the first engaging portion and the second engaging portion may be a recessed portion. The protrusion is fitted into the recessed portion.

A shape of the supplier is not limited to the above described shape. As a supplier 600 illustrated in FIG. 7E, the supplier 600 may have a circular shape or a semi-circular shape. In this case, a guide 601 may be a circumferential surface of the supplier 600 and an alignment portion 602 may be a cutout provided on the circumferential surface of the supplier 600.

A type of transferring of the image forming apparatus may be an intermediate transferring type. More specifically, as an image forming apparatus 700 illustrated in FIG. 8, the image forming apparatus 700 may include an intermediate transfer unit 701. The intermediate transfer unit 701 includes an intermediate transfer belt 702, a plurality of primary transfer rollers 703Y, 703M, 703C, 703K and a secondary transfer roller 704. The primary transfer roller 703Y transfers toner from the photoconductive drum 51Y to the intermediate transfer belt 702. The primary transfer roller 703M transfers toner from the photoconductive drum 51M to the intermediate transfer belt 702. The primary transfer roller 703C transfers toner from the photoconductive drum 51C to the intermediate transfer belt 702. The primary transfer roller 703K transfers toner from the photoconductive drum 51K to the intermediate transfer belt 702. The secondary transfer roller 704 transfers the toner from the intermediate transfer belt 702 to the sheet S.

Figure 8:
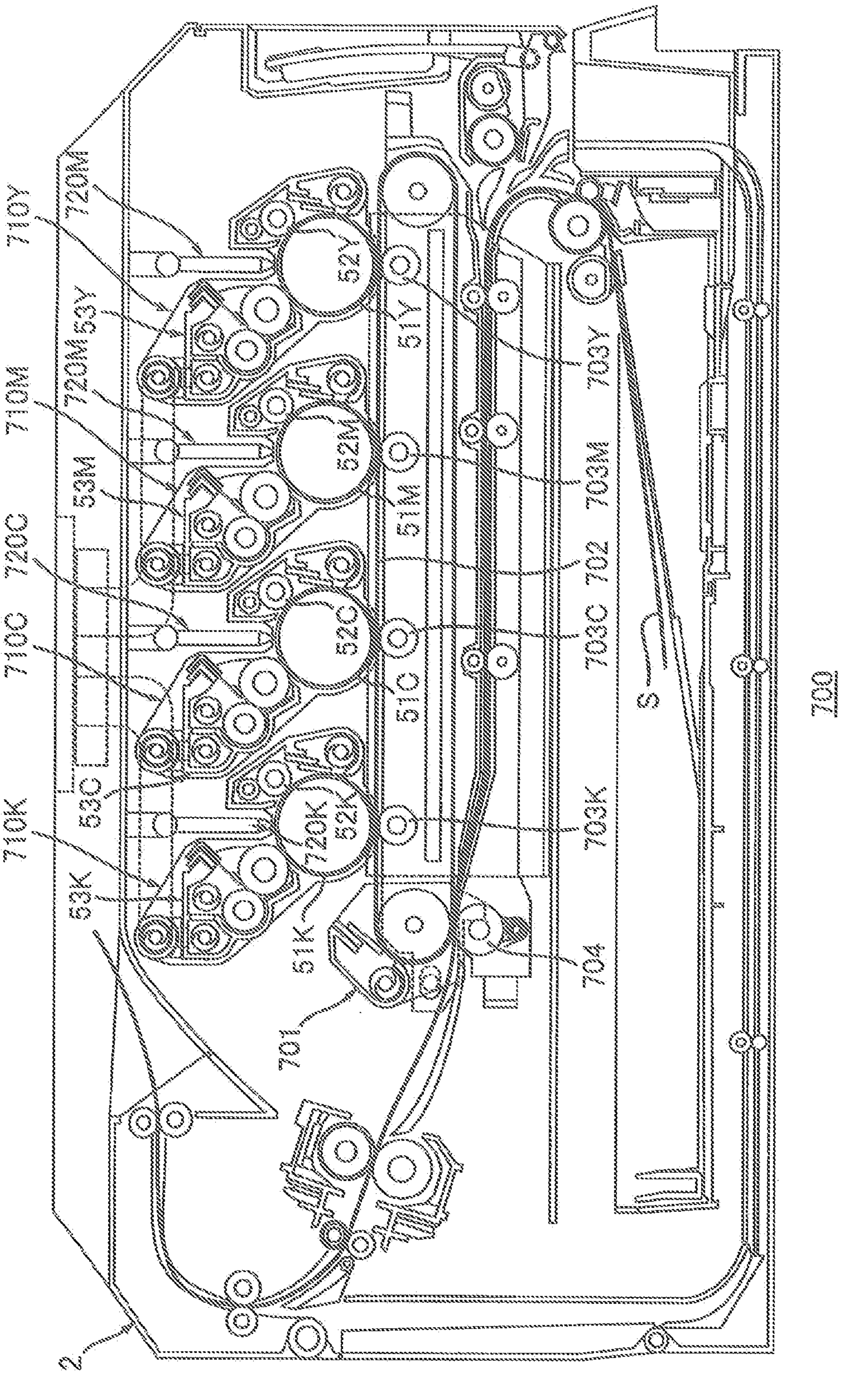
FIG. 8 is a view for explaining a supplier.

As illustrated in FIG. 8, the image forming apparatus 700 may include a plurality of process cartridges 710Y, 710M, 710C, 710K. The process cartridge 710Y includes the photoconductive drum 51Y, the charging unit 52Y and the developing unit 53Y. The process cartridge 710M includes the photoconductive drum 51M, the charging unit 52M and the developing unit 53M. The process cartridge 710C includes the photoconductive drum 51C, the charging unit 52C and the developing unit 53C. The process cartridge 710K includes the photoconductive drum 51K, the charging unit 52K and the developing unit 53K.

Figure 9:
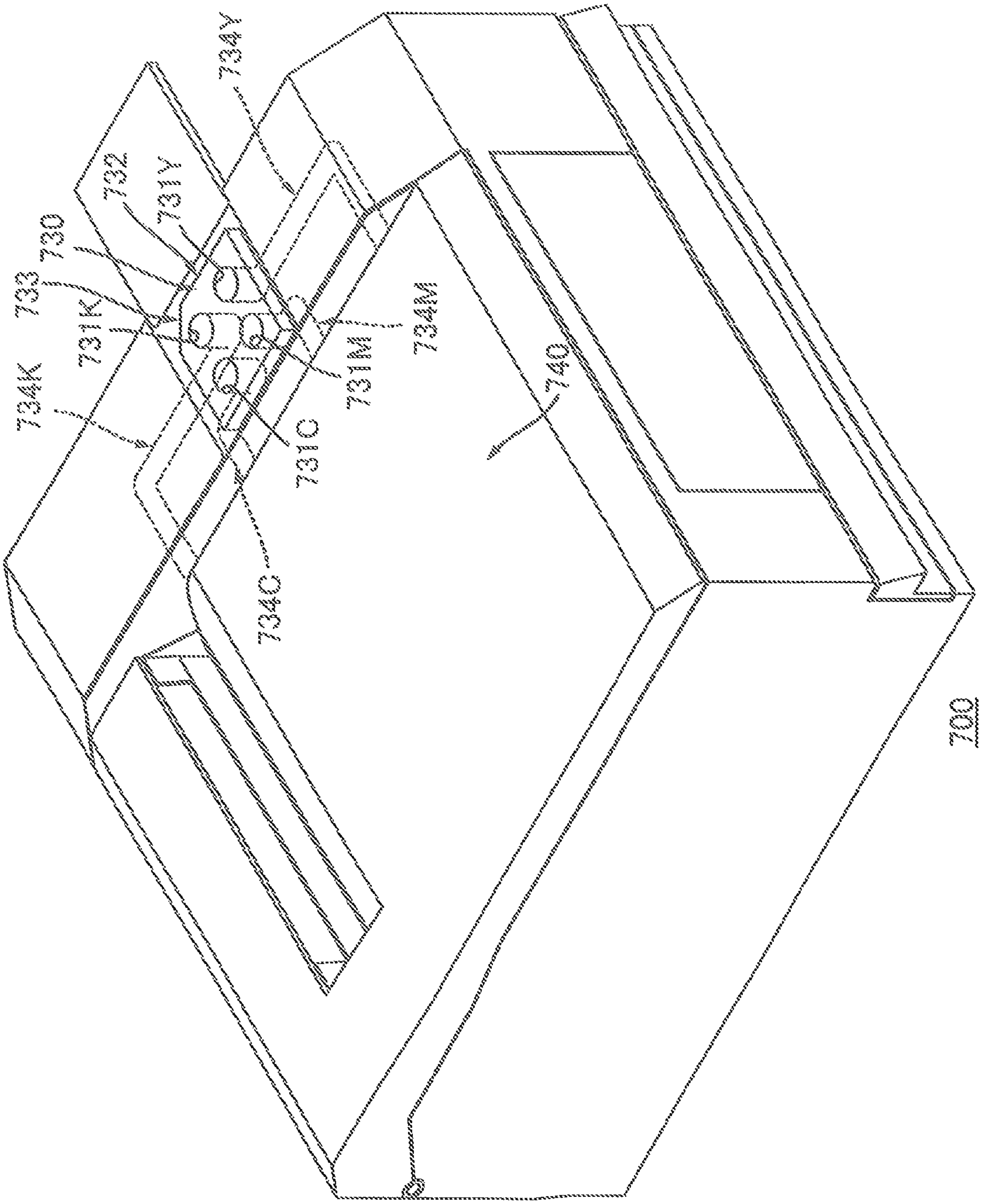
FIG. 9 is a view for explaining the supplier together with FIG. 8.

In this case, as illustrated in FIG. 9, the image forming apparatus 700 includes a supplier 730 and a plurality of toner tubes 734Y, 734M, 734C, 734K.

The supplier 730 may be located on a first side of a discharge tray 740 of the image forming apparatus 700 in the first direction. The supplier 730 includes a plurality of supply ports 731Y, 731M, 731C, 731K, a guide 732 and an alignment portion 733.

The toner tube 734Y allows the first toner to move from the supply port 731Y to the developing unit 53Y of the process cartridge 710Y. The toner tube 734M allows the second toner to move from the supply port 731M to the developing unit 53M of the process cartridge 710M. The toner tube 734C allows the third toner to move from the supply port 731C to the developing unit 53C of the process cartridge 710C. The toner tube 734K allows the fourth toner to move from the supply port 731K to the developing unit 53K of the process cartridge 710K.

A type of exposure of the image forming apparatus may be an exposure type using LED. As illustrated in FIG. 8, the image forming apparatus 700 includes a plurality of exposing heads 720Y, 720M, 720C, 720K. The exposing head 720Y is capable of exposing the photoconductive drum 51Y. The exposing head 720M is capable of exposing the photoconductive drum 51M. The exposing head 720C is capable of exposing the photoconductive drum 51C. The exposing head 720K is capable of exposing the photoconductive drum 51K.

Figure 10:
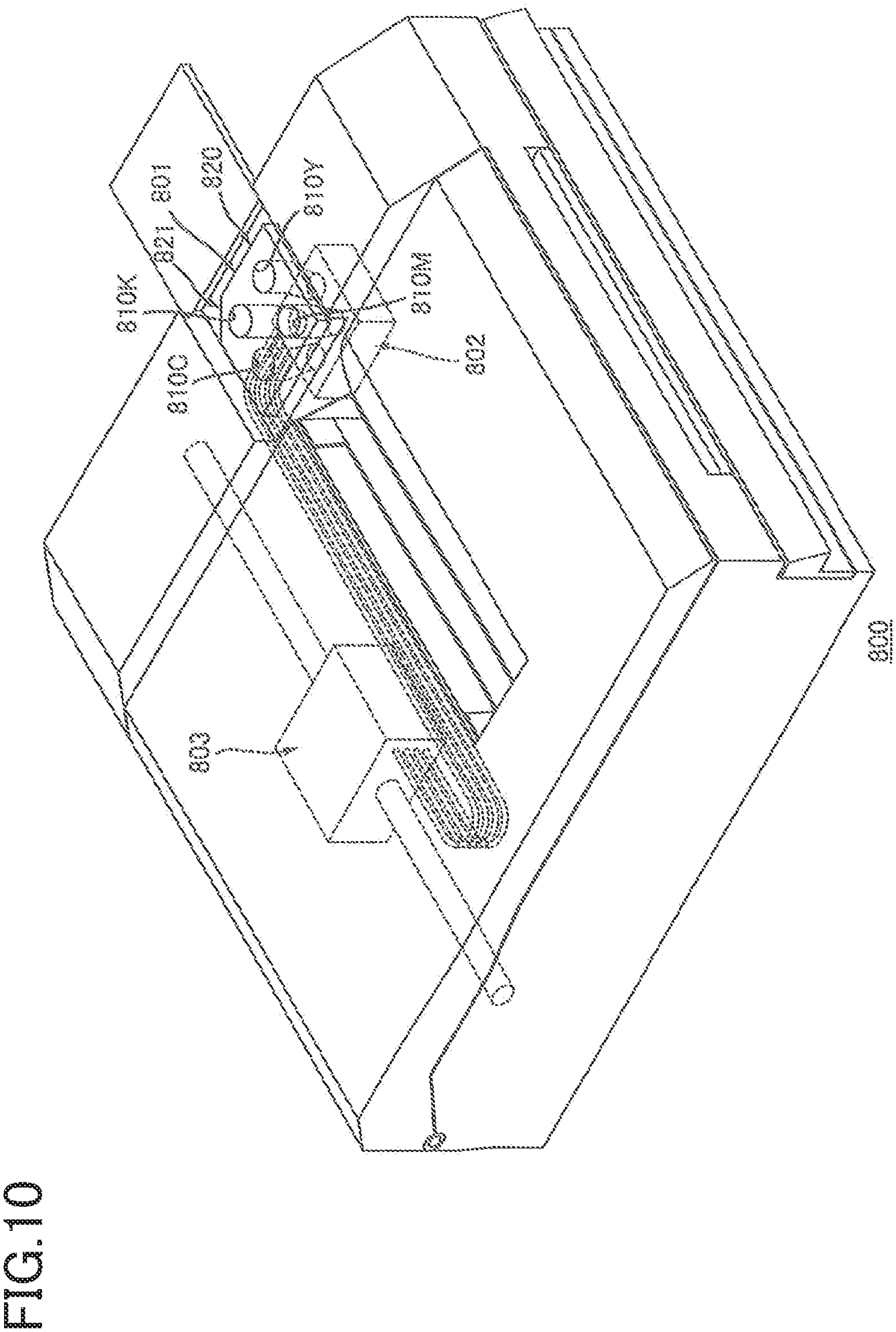
FIG. 10 is a view for explaining a supplier.

The image forming apparatus may be an ink-jet printer. As illustrated in FIG. 10, an image forming apparatus 800 includes an image forming unit and a supplier 801.

The image forming unit includes a tank unit 802 and a recording head 803.

The tank unit 802 includes a first ink tank, a second ink tank, a third ink tank and a fourth ink tank. That is, the image forming unit of the image forming apparatus 800 includes the first ink tank and the second ink tank. The first ink tank is capable of accommodating first ink as a first consumable item. The second ink tank is capable of accommodating second ink as a second consumable item. The third ink tank is capable of accommodating third ink. The fourth ink tank is capable of accommodating fourth ink.

The recording head 803 ejects the first ink supplied from the first ink tank, the second ink supplied from the second ink tank, the third ink supplied from the third ink tank and the fourth ink supplied from the fourth ink tank.

The supplier 801 includes a plurality of supply ports 810Y, 810M, 810C, 810K, a guide 820 and an alignment portion 821. The first ink supplied to the supply port 810Y is accommodated in the first ink tank. The second ink supplied to the supply port 810M is accommodated in the second ink tank. The third ink supplied to the supply port 810C is accommodated in the third ink tank. The fourth ink supplied to the supply port 810K is accommodated in the fourth ink tank.

What is claimed is:

1. An image forming system, comprising:

an image forming apparatus including:

an image forming unit including a first image former configured to form an image on a sheet by using a first consumable item and a second image former configured to form an image on the sheet by using a second consumable item, the image forming unit including a first accommodating portion capable of accommodating the first consumable item and a second accommodating portion capable of accommodating the second consumable item; and a supplier including a first supply port though which the first consumable item is supplied to the first accommodating portion and a second supply port through which the second consumable item is supplied to the second accommodating portion, and a guide which is used when the first consumable item is supplied to the first accommodating portion, or the second consumable item is supplied to the second accommodating portion;

a first bottle including a first connector having (i) a first outlet port connectable to the first supply port of the supplier and through which the first consumable item is supplied and (ii) a first guided portion configured to be guided by the guide in a state in which the first connector is attached to the supplier, the first bottle being capable of accommodating the first consumable item, the first outlet port communicating with the first supply port in the state in which the first connector is connected to the supplier; and a second bottle including a second connector having (i) a second outlet port connectable to the second supply port of the supplier and through which the second consumable item is supplied and (ii) a second guided portion configured to be guided by the guide in a state in which the second connector is attached to the supplier, the second bottle being capable of accommodating the second consumable item, the second outlet port communicating with the second supply port in the state in which the second connector is connected to the supplier, wherein the supplier is one supplier by which the first consumable item and the second consumable item are respectively supplied to the first image former and the second image former, and the image forming apparatus include a first conveyor configured to convey the first consumable item from the one supplier to the first image former and a second conveyor configured to convey the second consumable item from the one supplier to the second image former, wherein the first bottle and the second bottle are guided by the guide of the one supplier by turns, and wherein the first supply port is located at a position different from a position of the second supply port in the one supplier in a direction intersecting a guide direction in which the guide guides each of the first bottle and the second bottle.

2. The image forming system according to claim 1, wherein the image forming unit includes:

a first photoconductive drum;

a second photoconductive drum;

a first developing unit including the first accommodating portion and configured to supply first toner as the first consumable item to the first photoconductive drum; and a second developing unit including the second accommodating portion and configured to supply second toner as the second consumable item to the second photoconductive drum.

3. The image forming system according to claim 1, wherein the image forming unit includes:

a first ink tank capable of accommodating first ink as the first consumable item;

a second ink tank capable of accommodating second ink as the second consumable item; and a recording head configured to eject the first ink supplied from the first ink tank and the second ink supplied from the second ink tank.

4. The image forming system according to claim 1, wherein the first connector is not connectable to the supplier in a state in which the first outlet port does not communicate with the first supply port, and wherein the second connector is not connectable to the supplier is a state in which the second outlet port does not communicate with the second supply port.

5. The image forming system according to claim 4, wherein the image forming apparatus includes an alignment portion configured to position the first bottle with respect to the supplier when the first bottle is attached to the supplier and configured to position the second bottle with respect to the supplier when the second bottle is attached to the supplier, wherein the first bottle includes a first engaging portion engageable with the alignment portion, wherein the second bottle includes a second engaging portion engageable with the alignment portion, wherein the first connector is connectable to the supplier in a state in which the first engaging portion is engageable with the alignment portion, the first connector being not connectable to the supplier in a state in which the first engaging portion is not engageable with the alignment portion, and wherein the second connector is connectable to the supplier in a state in which the second engaging portion is engageable with the alignment portion, the second connector being not connectable to the supplier in a state in which the second engaging portion is not engageable with the alignment portion.

6. The image forming system according to claim 5, wherein the supplier includes the alignment portion, wherein the first connector includes the first engaging portion, and wherein the second connector includes the second engaging portion.

7. The image forming system according to claim 6, wherein the guide includes the alignment portion, wherein the first guided portion includes the first engaging portion, and wherein the second guided portion includes the second engaging portion.

8. The image forming apparatus according to claim 5, wherein the alignment portion is a cutout, and wherein each of the first engaging portion and the second engaging portion includes a surface extending along the cutout in a state in which a corresponding one of the first engaging portion and the second engaging portion engages with the alignment portion.

9. The image forming system according to claim 5, wherein the alignment portion is a recessed portion, and wherein each of the first engaging portion and the second engaging portion is a protrusion inserted into the recessed portion.

10. The image forming system according to claim 1, wherein the first bottle includes a first outlet portion having the first outlet port and configured to be inserted into the first supply port in a state in which the first connector is connected to the supplier, and wherein the second bottle includes a second outlet portion having the second outlet port and configured to be inserted into the second supply port in a state in which the second connector is connected to the supplier.

11. The image forming system according to claim 10, wherein the first connector is not connectable to the supplier in a state in which the first outlet portion is not inserted into the first supply port, and wherein the second connector is not connectable to the supplier in a state in which the second outlet portion is not inserted into the second supply port.

12. The image forming system according to claim 1, wherein a position of the second supply port in the supplier is different from a position of the first supply port in the supplier.

13. The image forming system according to claim 12, wherein a position of the first outlet port with respect to the supplier in the state in which the first connector is connected to the supplier is different from a position of the second outlet port with respect to the supplier in the state in which the second connector is connected to the supplier.

14. The image forming system according to claim 13, wherein the first guided portion has a structure the same as the second guided portion.

15. An image forming apparatus, comprising:

an image forming unit configured to form an image on a sheet by using a first consumable item and a second consumable item, the image forming unit including a first accommodating portion capable of accommodating the first consumable item and a second accommodating portion capable of accommodating the second consumable item; and a supplier to which a first bottle capable of accommodating the first consumable item or a second bottle capable of accommodating the second consumable item is connectable, the supplier including:

a first supply port through which the first consumable item is supplied to the first accommodating portion;

a second supply port through which the second consumable item is supplied to the second accommodating portion;

a guide configured to guide the first bottle so as to be connected to the supplier when the first consumable item is supplied to the first accommodating portion and configured to guide the second bottle so as to be connected to the supplier when the second consumable item is supplied to the second accommodating portion, wherein the guide is configured to guide a first guided wall protruding in a downward direction from the first bottle in a state in which the first bottle is connected to the supplier, and the guide is configured to guide a second guided wall protruding in the downward direction from the second bottle in a state in which the second bottle is connected to the supplier.

16. A bottle connectable to an image forming apparatus, the image forming apparatus comprising:

an image forming unit configured to form an image on a sheet by using a first consumable item and a second consumable item, the image forming unit including a first accommodating portion capable of accommodating the first consumable item and a second accommodating portion capable of accommodating the second consumable item;

a supplier including a first supply port through which the first consumable item is supplied to the first accommodating portion and a second supply port through which the second consumable item is supplied to the second accommodating portion, and a guide which is used when the first consumable item is supplied to the first accommodating portion or the second consumable item is supplied to the second accommodating portion, the bottle being connectable to the supplier;

wherein the bottle is capable of accommodating the first consumable item, wherein the bottle includes a connector connectable to the supplier and having (i) an outlet port through which the first consumable item is supplied and (ii) a guided portion configured to be guided by the guide when the connector is attached to the supplier, and wherein the outlet port communicates with the first supply port in a state in which the connector is connected to the supplier, and wherein the guide is configured to guide a guided wall protruding in a downward direction from the bottle in a state in which the bottle is connected to the supplier.

17. The image forming apparatus according to claim 15, wherein the first supply port and the second supply port of the supplier are surrounded by the first guided wall of the first bottle in a state in which the first guided wall is in contact with the guide, and the first supply port and the second supply port are surrounded by the second guided wall of the second bottle in a state in which the second guided wall is in contact with the guide.

18. The image forming apparatus according to claim 15, wherein a first hollow protruding portion protruding from the first bottle through which the first consumable item is supplied to the supplier is inserted into the first supply port in the state in which the first bottle is connected to the supplier, and a second hollow protruding portion protruding from the second bottle through which the second consumable item is supplied to the supplier is inserted into the second supply port in the state in which the second bottle is connected to the supplier, the first hollow protruding portion being formed inside the first guided wall, the second hollow protruding portion being formed inside the second guided wall.

19. An image forming system, comprising:

an image forming apparatus including:

an image forming unit configured to form an image on a sheet by using a first consumable item and a second consumable item, the image forming unit including a first accommodating portion capable of accommodating the first consumable item and a second accommodating portion capable of accommodating the second consumable item; and a supplier including a first supply port through which the first consumable item is supplied to the first accommodating portion and a second supply port through which the second consumable item is supplied to the second accommodating portion, and a guide which is used when the first consumable item is supplied to the first accommodating portion, or the second consumable item is supplied to the second accommodating portion;

a first bottle including a first connector having (i) a first outlet port connectable to the supplier and through which the first consumable item is supplied and (ii) a first guided portion configured to be guided by the guide in a state in which the first connector is attached to the supplier, the first bottle being capable of accommodating the first consumable item, the first outlet port communicating with the first supply port in the state in which the first connector is connected to the supplier; and a second bottle including a second connector having (i) a second outlet port connectable to the supplier and through which the second consumable item is supplied and (ii) a second guided portion configured to be guided by the guide in a state in which the second connector is attached to the supplier, the second bottle being capable of accommodating the second consumable item, the second outlet port communicating with the second supply port in the state in which the second connector is connected to the supplier, wherein the guide is configured to guide the first guided portion in a state in which the second guided portion is not guided by the guide, and the guide is configured to guide the second guided portion in a state in which the first guided portion is not guided by the guide.

* * * * *